United States Patent Office 3,367,107
Patented Feb. 6, 1968

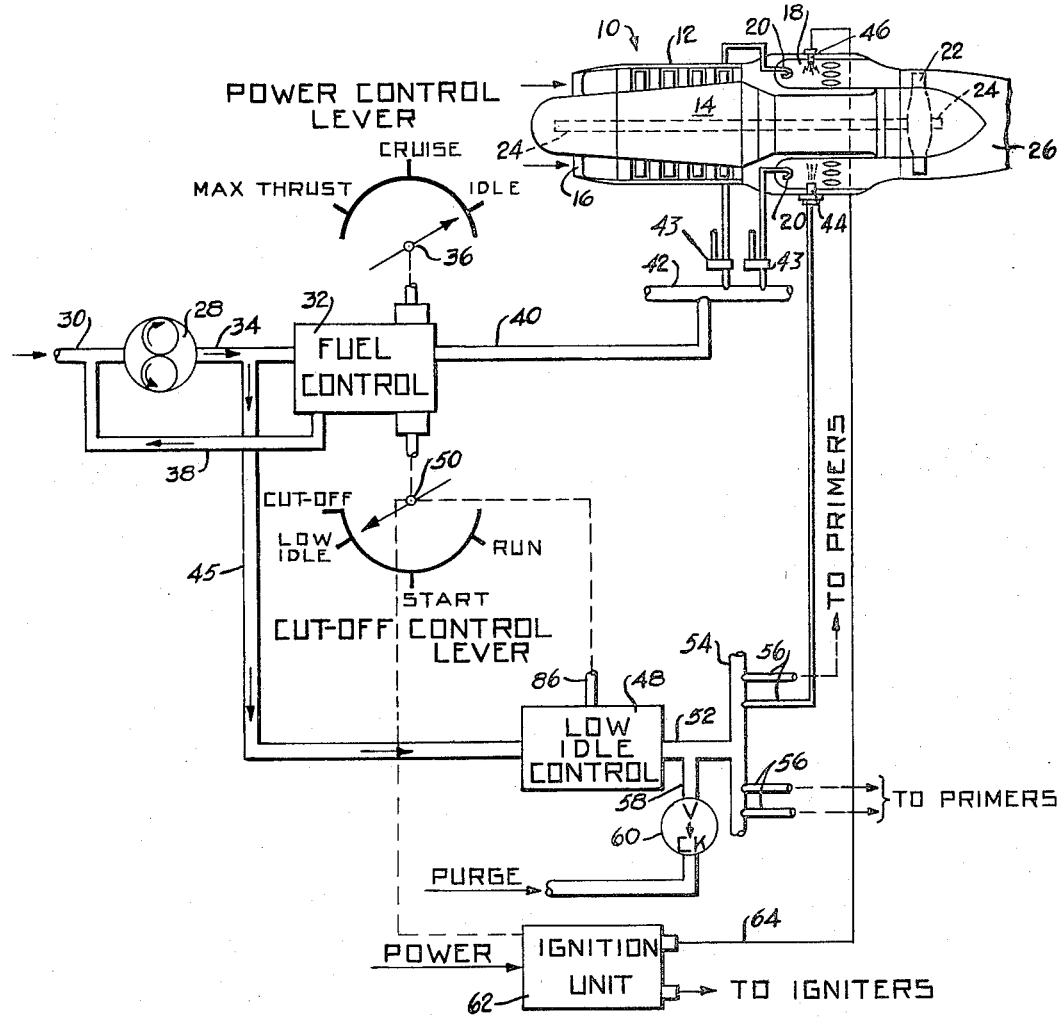

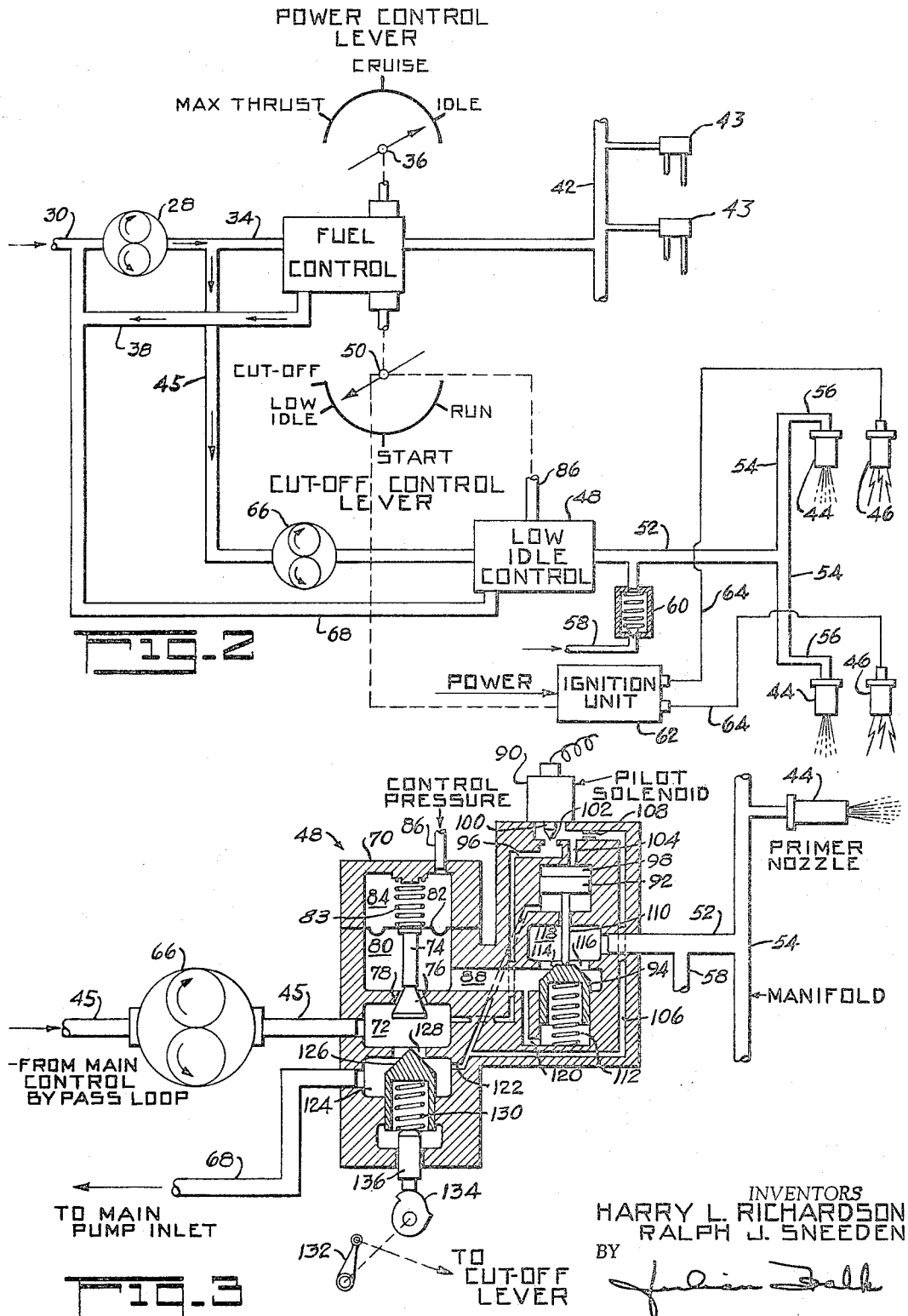

3,367,107
LOW IDLE FUEL CONTROL SYSTEM
Harry L. Richardson, River Edge, and Ralph J. Sneeden, Woodcliff Lake, N.J., assignors to Curtiss-Wright Corporation, a corporation of Delaware
Filed Oct. 5, 1965, Ser. No. 493,113
3 Claims. (Cl. 60—39.28)

ABSTRACT OF THE DISCLOSURE

A fuel system having a valve regulating the flow of fuel from a pump to fuel nozzles, which can be of the vaporizing type, in the combustion chamber of a jet engine. The fuel supplied by the fuel nozzles supports the main source of engine combustion. A low idle valve regulates the flow of fuel from the pump to a group of primer nozzles in the combustion chamber. A control lever mechanism operatively coordinates the valves to form a low idle fuel system. This low idle system maintains vaporization temperatures in the combustion chamber during in flight periods when the flow of fuel to the fuel nozzles is cut off. The operation of the fuel system can be adjusted from main combustion to low idle and return to main combustion without being shut down. Combustion at the primer nozzles is insufficient to establish significant engine thrust.

This invention relates to fuel control systems for jet engines and the like and more particularly to a low idle fuel control system for said engines.

One difficulty with high speed jet engines in use today, such as the engines used for supersonic aircraft, lies in their high fuel consumption during low altitude maneuvering conditions and the relatively high idle thrust which makes for a long descent time from cruise altitude to a landing approach. Such high speed engines produce a significant thrust even at the idle setting and the descent time needed while operating at the idle thrust setting is considered too long and the fuel consumption too high. In other words, the engine thrust cannot be reduced enough to permit low fuel consumption operation and a relatively rapid descent at normal idle operation. It is of course undersirable to shut down the engines during the high altitude descent and low altitude maneuvering conditions because of the safety hazard attendant with restarting engines of this type.

The present invention has for its prime purpose the provision of a low idle fuel control system which permits the engines to operate at substantially windmilling conditions during the low idle cycle while making it possible to restart the engines for normal operation when desired. Thus, the high speed engines will be able to operate with minimum fuel consumption and relatively low thrust during high altitude descent and low altitude maneuvering conditions with the capability of reliable and rapid restarting.

The invention is generally carried out by providing a secondary fuel control system which operates in conjunction with the primary fuel control system which supplies the fuel nozzles for the main combustors of the jet engine. The secondary fuel control system is operative to supply a plurality of primer nozzles for injecting sufficient fuel into the combustors to maintain a flame therein so that when the primary fuel control system is activated, a primer flame will be present for initiating main combustion. Thus, during operation of the secondary fuel control system, a primer flame will be present in the combustion chambers of the engine, but there will not be sufficient combustion to produce excessive thrust. During this operation therefore, the compressor will be operating at substantially windmilling conditions. It will be apparent that during the low idle cycle, a minimum amount of fuel will be consumed by the engines since only sufficient amounts need be supplied for maintaining a primer flame, and it will also be seen that the engine will be supplying substantially no thrust, which is desirable for a relatively rapid descent. Further, for low altitude, low Mach number cruise conditions, as might be require for going to an alternate destination, assuming a multi-engine aircraft of, for example four engines, two engines can be placed in the low idle operating mode and the other two engines operated at a relatively high power level where the specific fuel consumption is more favorable. The net result is a saving in fuel.

Accordingly, it is one object of the invention to provide a novel and improved fuel control system for jet engines and the like.

It is a further object of the invention to provide a novel and improved low idle fuel control system for jet engines or the like.

It is still another object of the invention to provide a novel and improved fuel control system for jet engines and the like which permits operation at substantially windmilling low thrust output conditions and is capable of reliable and relatively rapid restarts.

Other objects and advantages of the invention will be best understood upon reading the following detailed description with the accompanying drawings wherein:

FIG. 1 is a diagrammatic view of the fuel control system of the invention for a jet engine;

FIG. 2 is a diagrammatic view of a second embodiment of the invention; and

FIG. 3 is a partial sectional view of the control systems of FIGS. 1 and 2 showing one of the control units in section.

Referring to FIG. 1, there is shown therein a turbojet engine 10 which comprises an outer housing 12 having journalled therein an axial flow compressor 14, which compressor 14 serves to supply compressed air for combustion. Air is received in a forwardly directed inlet portion 16 at the forward end of the housing 12, which air is then compressed by the compressor 14 and supplied to an annular combustion chamber 18. Fuel is supplied to the combustion chamber 18 by fuel nozzles 20, as will be described in greater detail below, whereby the fuel and air are mixed in the combustion chamber 18 for combustion therein. The hot combustion gases from the combustion chamber 18 co-act with the blades of a turbine 22 for driving said turbine. The turbine 22 and the compressor 14 are drivably connected through a common shaft 24 so that the turbine 22 drives the compressor 14 through said shaft 24. An outlet duct 26 is provided at the rearward end of the engine 10 through which the hot gases from the turbine assembly discharge into the surrounding atmosphere whereby the engine is provided with a forward propulsive thrust.

In order to supply fuel to the main fuel nozzles 20, a first or primary fuel system is provided which comprises a main pump 28 which has its inlet side connected to a suitable fuel supply source (not shown) through a conduit 30 and has its outlet connected to a fuel control 32 through an outlet conduit 34. The fuel control, diagrammatically illustrated at 32, may be of any suitable type valve construction which can regulate the flow of fuel delivered from the pump 28 in accordance with a desired fuel flow level demanded by the power control lever shown at 36. The pump 28 is preferably driven from the engine shaft 24. During operation of the engine, the pump 28 may have an output greater than that called for by the fuel control 32, and in order to compensate for the excess of fuel supplied by the pump 28, a bypass loop is provided which consists of a conduit 38 operatively connected through the fuel control 32 to the pump outlet side and to the inlet side of the pump at conduit 30 so that the excess fuel supplied by the pump 28 may be recycled from the fuel control back into the inlet side of the pump 28.

The outlet side of the fuel control 32 is connected through an outlet conduit 40 to a fuel supply manifold 42. The manifold 42 connects a plurality of fuel nozzles 20, two being shown in FIG. 1, to the fuel supply line 40 through fuel flow dividers 43 for supplying controlled amounts of fuel to the combustion chamber 18. The fuel flow dividers 43 provide for even distribution of the fuel to the nozzles 20. It should be understood that any number of fuel nozzles 20 may be provided and that only two are shown for purposes of explanation. The fuel nozzles 20 are of the type which are commonly referred to as fuel vaporizers in that the incoming fuel which cools the nozzle 20 is vaporized by the heat in the combustion chamber and the vaporized fuel is then burnt in the combustion chamber 18.

The power control lever 36 cooperates with the fuel control valve assembly 32 to regulate the flow of fuel to the nozzles 20 between a maximum fuel flow wherein the lever 36 is in the position "Max Thrust" shown on the control lever indicator in FIG. 1, and a position of minimum fuel flow wherein the lever 36 would be in the "Idle" position.

As briefly described above, the fuel nozzles 20 are of the vaporizing type wherein the heat from combustion serves to vaporize the fuel discharged from said nozzles for combustion in the combustion chamber 18. When the engine is cold, vaporization of the fuel will not readily occur and a means must be provided for establishing a flame in the combustion chamber for starting the engine. Further, it will be apparent that, if at any time during engine operation the main fuel supply is shut down, it will be difficult to restart the engine due to the lack of heat in the combustion chamber for vaporizing the fuel. The present invention advantageously provides a system through which starting of the engine can be carried out and also restarting may be accomplished during intermittent shut-downs of the engine.

In order to carry out the principal advantages of the invention, one or more primer nozzles 44 are disposed for spraying relatively small amounts of fuel into the combustion chamber in the form of a relatively fine spray. An igniter 46 is associated with each primer nozzle 44 for igniting the fuel from said nozzles 44, particularly during cold engine starting. A second fuel control system, operatively associated with the primary fuel control system, is provided for supplying fuel to the primer nozzles 44 and for activating the igniters 46 when desired.

Referring to FIG. 1, fuel is supplied to the second fuel control system, hereinafter called the low idle fuel system, through an outlet conduit 45 connected to the conduit 34 at the outlet side of the pump 28, which conduit 45 is connected to the inlet side of the low idle control valve assembly 48. The low idle control assembly 48 is regulated through a cutoff control lever 50. The cutoff control lever 50 is also connected to the fuel control 32 of the main fuel control system and serves to control both the low idle control 48 and the fuel control 32 for the positions shown on the indicator, those being, "Cutoff" or total engine shutdown, "Low Idle" operation, "Start," and "Run" or normal running operation. The low idle control 48 and the cutoff control lever 50 regulate the flow of fuel from the conduit 45 to an outlet conduit 52 which is connected to a manifold structure 54. The manifold structure 54 is provided with a plurality of outlet conduits 56, each being connected to a primer nozzle 44, there being only four such outlet conduits 56 shown in FIG. 1. A line or conduit 58 is connected to the conduit 52 between the low idle control 48 and the manifold 54, which line has a check valve 60 therein which opens in response to gas pressure in the direction of the arrow labeled "Purge" in FIG. 1. The purge line 58 is provided to purge the primer supply lines of all fuel when the primer nozzles are not in operation and may be supplied with air from the engine compressor or from a separate air or gas source. An ignition unit 62 is connected to each of the igniters 46 through a line or lines 64, there being one such line shown connected to an igniter 46 in FIG. 1, and is also connected to the cutoff control lever 50 so that, when it is desired to initiate a flame in the combustion chamber 18, the primer nozzles and igniters may be activated simultaneously. Such would be the condition when the control lever 50 is placed in the "Start" position. Power may be supplied to the ignition unit by any known suitable source.

Another embodiment of the invention is shown in FIG. 2 wherein substantially the same fuel control systems are provided as shown in FIG. 1 and like numerals are used for like elements. In the embodiment of FIG. 2 a second pump 66, hereinafter referred to as the low idle fuel pump, is provided in the line 45 and may be of smaller capacity than the main fuel pump 28. A second bypass loop 68 is provided which bypasses the overload or oversupply of fuel to the low idle control 48 and returns the oversupply to the main bypass loop 38 into the inlet side of the main fuel pump 28. Such a system may be necessary if it is found that the temperature rise in the main bypass loop 38 becomes too high. In the system shown in FIG. 2, during low idle operation, the main fuel pump 28 could be unloaded and the fuel supplied to the primer nozzles 44 through the low idle pump 66 with the oversupply being returned to the bypass loop 68. During normal engine operation, the low idle pump could be unloaded so as to prevent overheating in the low idle control system when the system is not in operation.

The low idle control valve assembly 48 is more clearly shown in FIG. 3. As illustrated therein, the low idle control valve assembly is provided with an outer housing 70 to which the fuel supply input line 45 is connected for supplying fuel to a cavity 72. A metering valve 74 has a head portion 76 thereon which controls the flow area of an aperture 78 in a wall portion of the valve housing 70 for connecting the cavity 72 to a cavity 80, as illustrated. The metering valve 74 is connected at one end to a diaphragm member 82 and is responsive to a differential in pressure across the diaphragm member 82 connected to said metering valve member 74 and supported in the housing 70. A spring member 83 is supported on a portion of the housing 70 and a portion of the metering valve member 74 to provide a substantially constant force to one side of the diaphragm 82. The valve member 74 is moved to an open or a closed position depending upon the differential in pressure across the diaphragm member 82. A control line 86 is connected to the reservoir or cavity portion 84 for supplying a controlled pressure to said cavity 84 in order to regulate the position of the metering valve member 74. The metering valve 74 can be adjusted to provide either a constant differential pressure across the primer nozzles 44 and hence constant fuel flow, constant delivery pressure to the primer nozzles and hence variable fuel flow appropriate to changes in the engine back pressure, and fuel flow scheduled as a function of altitude, rotor speed, and/or other engine variables. Thus, it will be seen that the mode of control of the metering valve 74 will depend on the pressure signal applied through the control pressure line 86 for regulating the position of the metering valve 74. For purposes of the present invention, however, the pressure applied to the cavity 84 through the control pressure line 86 may be generally referred to as control pressure. When the metering valve is lowered to open the aperture 78 for connecting the cavity 72 with the cavity 80, fuel can flow from the conduit 45 through the cavity 72 into the cavity 80 and into a fuel flow passageway 88. The flow of the fuel through the passageway 88 is further controlled by a shut-off valve assembly.

The shut-off valve assembly comprises generally, a pilot-solenoid valve member 90, a piston valve member 92, and a spring-biased valve member 94. A passageway 96 is connected to one end of the cavity 72 to supply a liquid pressure to the top of the piston valve member 92 located in the cavity 98. The pilot-solenoid valve is provided with a valve stem 100 which may open or close an aperture 102 to a small cavity positioned in the passageway 96, as illustrated. Another passageway 104 connects the passageway 96 to the upper portion of the valve member 92 in the cavity 98. A bypass line 106 also connects the passageways 96 and 104 for returning the overflow or excess liquid fuel supplied to the top of the piston valve member 92 to the bypass loop 68, as will be explained hereinafter. A restriction 108 is provided in the passageway 106 to insure that pressure will be maintained on the valve member side of said restriction but also permitting the excess of fuel supply to be bypassed through the bypass loop.

The piston valve member 92 is provided with a stem portion 110 which rests on a portion of a valve member 94, which valve member 94 is normally biased in an upward direction by a spring 112, as viewed in FIG. 3. The valve member 94 is positioned in the passageway 88 and has an upper valve portion 114 which, during the raising and lowering of the valve member 94, may open or close an aperture 116 in the housing 70. It will be seen, therefore, that when the valve member 94 is lowered to open the aperture 116, the passageway 88 will be connected through said aperture 116 to a cavity 118 to which the output line 52 is connected leading to the manifold 54. A relatively small passageway 120 leading from the supply passageway 88 is connected to the bottom side of the valve member 94 to help balance the opposing fluid pressure on the opposite side of the valve member and to aid in maintaining the valve member in a closed position when the pilot solenoid is activated to a closed position to cut off the fluid pressure from the upper portion of the piston valve member 92. A bypass passageway 122 is also connected between the lower portion of the valve member 92 and a bypass cavity 124 in the housing 70. The passageway 122 serves to return any leakage past the valve member 92 to said bypass cavity 124.

A bypass valve member 126 is positioned in the cavity 124 with its valve head being positioned for opening and closing an aperture 128 connecting the cavities 72 and 124. The bypass valve member is arranged to provide working pressure only during the low idle mode and is spring-loaded by a spring member 130 only when the cutoff lever is placed in the low idle position for operation in the low idle mode. As illustrated in FIG. 3, the cutoff lever is connected through a suitable linkage 132 and a cam member 134 to a shaft or pin member 136 upon which rests the spring member 130. When the cutoff lever 50 is placed in the low idle position, the cam portion 134 raises the shaft member 136 against the spring 130 to bias the valve member 126 for closing the aperture 128. Thus, working pressure will be developed in cavity 72 and only the excess fuel will flow past the bypass valve 126. The working pressure so developed will also serve to actuate the shut-off valve piston 92.

During normal engine operation, the pilot solenoid 90 is disposed such that the stem portion 100 closes the aperture 102 so that no fluid pressure is supplied to the top of the piston valve member 92 and thus the shut-off valve member 94 will raise up so that its head portion 114 closes the aperture 116 to prevent flow of fuel through the passageway 88 into the conduit 52. At the same time, the bypass valve member 126 is in a lowered position so that the supply cavity 72 is in communication with the bypass cavity 124 to permit the fuel to bypass into the bypass loop 68. Thus, it will be seen that, during normal engine operation, the pump 66 is unloaded and that no fuel will be supplied to the primer nozzles 44. During starting or in the low idle mode, the operation is such that the pilot-solenoid valve 90 opens the aperture 102 and the bypass valve member 126 closes the aperture 128 so that fuel will be supplied from the pump 66 to the line 45, cavity 72, aperture 78, passageway 88, cavity 118, and supply conduit 52 to the primer nozzles 44.

The operation of the low idle fuel system for either the embodiments of FIG. 1 or FIG. 2 is as follows: When it is desired to operate in the low idle mode, the power lever 36 is set into the "Idle" position. The cutoff lever 50 is moved from the "Run" position to the "Low Idle" position, at which time the fuel to the main vaporizing nozzles 20 is cut off and, in the embodiment of FIGS. 2 and 3, the bypass valve member 126 will be set to provide supply pressure in the low idle control for the primer nozzles 44. The pilot-solenoid valve 90 is appropriately adjusted for permitting the fuel pressure to flow to the supply conduit 52 by appropriately permitting fluid pressure to act on the head area of the piston valve member 92 to open the shut-off valve member 114. If it is desired, the ignition system may be simultaneously activated when the lever 50 is in the "Low Idle" position or the ignition system may be connected so as to be activated only during the starting mode.

When the controls 36 and 50 are positioned as described above and the low idle mode is now in operation, the primer nozzles 44 will be supplied with fuel and should light off due to the heat present in the combustion chamber 18 or alternatively through the activation of the igniters 46. However, it is preferable not to shut off the main fuel supply through control lever 36 until the primer fuel is ignited and it is considered within the scope of the invention to synchronize the controls including the linkage 132 and cam 134 to bring about this result. Since the fuel will be substantially shut off from flow to the main nozzles 20 during the low idle mode and because the combustion provided by the primer nozzles 44 provides substantially no thrust, it will be seen that the compressor 14 will be operating at essentially windmill drag thrust conditions. It will be further seen that while in the low idle mode, the engine will be operating at minimum fuel flow conditions since the primer nozzles only supply sufficient fuel for maintaining a flame in the combustion chamber 18. Because the engine is now operating at drag thrust conditions, the descent of the aircraft may be accomplished relatively more quickly from a high speed, high thrust operating condition without any danger of returning the engines to normal operating speeds and thrust output when necessary since a flame will be present in the combustion chamber at all times.

When it is desired to bring the engine up to idle or operating speed, the cutoff control lever 50 is moved from the "Low Idle" position to the "Start" position, at which time the bypass valve member 126 will be reset to the proper level and idle fuel flow will be established to the vaporizing nozzles 20. As the engine comes up to idle, the cutoff lever 50 may be moved into the "Run" position, at which time the low idle control system will be deactivated. The primer nozzles 44 are preferably purged by compressor discharge air through the line 58 and valve member 60, as described above. In order to increase the thrust of the engine at this time, the power control lever may be adjusted in the direction of "Max Thrust" whereupon the fuel flow to the nozzles 20 will be increased for increasing the engine speed and thrust output. For complete engine shutdown, the power control lever 36 is placed in the "Idle" position and the cutoff lever is moved to the "Cutoff" position.

From the above detailed description it will be seen that a novel and improved fuel control system for a turbojet engine or the like is provided, which fuel system allows for minimum fuel flow conditions during descent and low altitude maneuvering situations and also permits the engine to operate at essentially windmilling drag thrust conditions for quicker descents from high altitude, high speed, high thrust operation.

While the invention has been described in detail in its present preferred embodiments, it will be obvious to those skilled in the art, after understanding the invention, that various changes and modifications may be made therein without departing from the spirit or scope thereof. It is intended in the appended claims to cover all such modifications.

What is claimed is:

1. A fuel system for jet engines or the like having a primary and a low idle operating state, the jet engine including a combustion chamber for providing the jet engine with a thrust output, a compressor for supplying air to the combustion chamber, and a turbine operably driven by combustion gases from the combustion chamber and connected to the compressor for the driving thereof, the fuel system comprising:
 (a) first means for supplying fuel including
  (i) a plurality of fuel nozzles for supplying fuel to the combustion chamber for supporting primary combustion therein, and
  (ii) first control means for supplying the fuel to the fuel nozzles, the first control means varying the primary combustion between idle and maximum thrust output conditions;
 (b) second means for supplying fuel including
  (i) a plurality of primer nozzles for supplying fuel to the combustion chamber for supporting low idle combustion therein, and
  (ii) second control means for supplying the fuel to the primer nozzles; and
 (c) means connected to and controlling the first and second supplying means including
  (i) means for coordinating the operation of the first and second supplying means to cause the first supplying means to be operative in the primary operating state and the second supplying means to be operative in the low idle operating state so that the primary combustion can be periodically shut down and restarted, and
  (ii) means for regulating the second control means to modulate the rate of fuel flow in the second supplying means as a function of engine operating conditions.

2. A fuel system as described in claim 1 wherein the regulating means modulates the rate of fuel flow as a function of compressor discharge air pressure so as to maintain a substantially constant fuel to air ratio in the combustion chamber in the low idle operating state.

3. A fuel system, as described in claim 2, including a plurality of igniters for ignition of fuel supplied to the primer nozzles, and in which the coordinating means is operable for causing the fuel system to pass from the primary to the low idle operation by shutting down the flow of fuel to the fuel nozzles, establishing the flow of fuel to the primer nozzles, and rendering the igniters effective to ignite fuel discharging from the primer nozzles.

References Cited
UNITED STATES PATENTS

| | | | |
|---|---|---|---|
| 2,635,425 | 4/1953 | Thorpe et al. | 60—39.27 |
| 2,694,899 | 11/1954 | Hague | 60—39.14 |
| 2,928,240 | 3/1960 | Burton et al. | 60—39.14 |
| 3,019,603 | 2/1962 | Kreutzer | 60—39.28 |
| 3,135,088 | 6/1964 | Holmes | 60—39.14 X |

JULIUS E. WEST, *Primary Examiner.*